United States Patent Office 3,746,665
Patented July 17, 1973

3,746,665
POLYURETHANE BASED ON BLENDS OF POLY (OXYCAPROYL) DIOLS AND POLY(OXYTETRA-URETHYLENE) DIOLS
Joseph V. Koleske and George Magnus, Charleston, W. Va., assignors to Union Carbide Corporation, New York, N.Y.
No Drawing. Filed Aug. 2, 1971, Ser. No. 168,419
Int. Cl. C08g 22/44, 22/10, 41/04
U.S. Cl. 260—2.5 AN
9 Claims

ABSTRACT OF THE DISCLOSURE

This invention relates to the manufacture of poly(oxytetramethylene)-polyurethane products which exhibit markedly improved tensile strength while retaining a high level of other mechanical properties. These products are prepared by reacting (i) a mixture of polymeric diols which comprise defined amounts of relatively high molecular weight poly(oxycaproyl) diol and relatively low molecular weight poly(tetramethylene oxide) glycol with (ii) a diisocyanate compound and (iii) a difunctional chain extender, and optionally, additional ingredients such as catalyst, surfactant, blowing agent, dyes, etc.

---

This invention relates to the preparation of poly(oxytetramethylene)-polyurethane products which exhibit markedly improved tensile strength while retaining a high level of other mechanical properties especially good compression set.

Polyurethane products can be prepared by reacting polymeric polyols, polyisocyanate compounds, and polyfunctional chain extenders which are characterized by active-hydrogen containing groups such as hydroxyl, primary amino, secondary amino, and mixtures thereof. Depending upon the technique and procedure employed as well as the choice and concentration of the reactants and other ingredients, if any, there can be produced products which are known to the art as millable polyurethanes, thermoplastic polyurethanes, thermoplastic processable polyurethanes, etc. The use of water or halcarbon blowing agent in polyurethane-producing formulations will produce porous polyurethanes of widely varying cell structure and density which can range from a dense microcellular structure to foamed products which have a density less than two pounds per cubic foot.

Oftentimes in the rubber industry one relates the integrity of a polyurethane elastomer with its tensile strength characteristic, that is, its ability to resist failure under a deforming force. In general, a polyurethane elastomer with high tensile strength will exhibit good resistance to abrasion. This characteristic is desirable in the manufacture of spandex or elastic fibers and in coating applications. By way of illustration, recent trends in automobile design and manufacture involve the use of microcellular polyurethane bumpers. Such bumpers, though possessing acceptable mechanical properties, must be coated with a colored substrate to match the color scheme of the automotive body. To this end, polyurethane coatings are widely employed. However, such coated microcellular bumpers are subjected to extensive abuse and abrasive forces which are encountered with normal usage and everyday automotive driving. Consequently, it is highly desirable to have such bumpers coated with a substrate which exhibits high resistance to abrasion (or high tensile strength) while maintaining a wide spectrum of other desirable mechanical properties.

It has now been discovered that novel elastomeric polyurethanes can be prepared which exhibit marked improvement in tensile strength while retaining a high level of desirable mechanical properties including good compression set. This unexpected discovery is made possible by using a mixture of well-defined dihydroxyl-terminated polymers in the polyurethane-producing formulation which also comprises an organic diisocyanate, a difunctional chain extender, and optionally, a blowing agent, catalyst, surfactant, and other ingredients, if so desired, and depending on the nature of the ultimate polyurethane produce.

Broadly speaking, the novel process is directed to the preparation of novel poly(oxytetramethylene)-polyurethane products having markedly improved tensile strength which comprises reacting (i) a mixture comprising polymeric diols with (ii) an organic diisocyanate, and (iii) a difunctional chain extender in which the active hydrogen-containing functional groups thereof are preferably hydroxyl, primary amino, secondary amino, and/or mixtures thereof, (iv) wherein the molar ratio of the sum of polymeric diol mixture plus difunctional chain extender to organic diisocyanate is in the range of from about 0.9 to about 1.1, (v) wherein the molar ratio of said polymeric diol mixture to said organic diisocyanate is in the range of from about 1.0:1.1 to about 1:8, and (vi) wherein the molar ratio of said polymeric diol mixture to said difunctional chain extender is in the range of from about 1.0:1.1 to about 1:7.

The mixture comprising polymeric diols which is employed in the practice of the novel process comprises (a) from about 3 to about 30 weight percent, preferably from about 5 to about 25 weight percent, of poly-oxycaproyl) diol which has a number average molecular weight of from about 3500 to about 40,000, preferably from about 5000 to about 25,000, and which is characterized by the recurring structural linear unit of the formula:

(I) 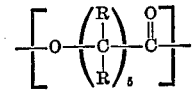

wherein each R individually represents hydrogen or lower alkyl, e.g., methyl, ethyl, n-propyl, isopropyl, n-butyl, isobutyl, and t-butyl, with the proviso that no more than three R substituents are groups other than hydrogen, and (b) from about 97 to about 70 weight percent, preferably from about 95 to about 75 weight percent, of poly(tetramethylene oxide) glycol which has a number average molecular weight of from about 700 to about 3500, preferably from about 1000 to about 3000; said poly(oxycaproyl) diol and said poly(tetramethylene oxide) glycol differing in number average molecular weight by at least about 1000, preferably by at least about 2500. It has been observed that a polymeric diol mixture comprised of the aforesaid poly(oxycaproyl) diol and polyether glycols such as poly(oxyethylene) glycol, poly(oxypropylene) glycol, and mixtures thereof, failed to give polyurethane products which exhibited any worthwhile improvement in tensile strength and compression set.

The aforedescribed recurring linear unit (I) is interconnected through the oxy groups (—O—) of one unit with the carbonyl group

of a second unit. In other words, the interconnection of these units does not involve the direct bonding of two carbonyl groups, i.e.

Those polymeric diols which are characterized by recurring units (I) supra contain greater than about 50 weight percent of such units, preferably greater than 75 weight percent, in the polymer. Minor amounts of other moieties or groups can be interspersed along the polymeric chain such as the urethane group,

the oxyalkylene groups

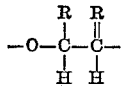

wherein R is lower alkyl, e.g., methyl, ethyl, etc.; the mono- and polyaromatic rings including fused and bridged rings such as phenylene, biphenylene, naphthylene, phenylene-alkylene-phenylene, and phenylene-alkylidene-phenylene; initiator moieties; etc.

The preparation of the poly(oxycaproyl) diols thus characterized with recurring units (I) supra is well-documented in the art, e.g., U.S. 3,169,945, U.S. 3,248,417, and U.S. 3,021,309 to U.S. 3,021,317. A general procedure involves reacting a molar excess of epsilon-caprolactone (and/or lower alkyl substituted epsilon-caprolactone) with an initiator which contains two active hydrogen-containing groups, e.g., hydroxyl, primary amino, secondary amino, and mixtures thereof, such groups being capable of opening the lactone ring whereby it adds as an open chain to the site of the active hydrogen-containing group, at an elevated temperature, preferably in the presence of a catalyst such as tetrabutyltitanate, stannous octanoate, etc., for a period of time sufficient to produce the poly(oxycaproyl) diols. By carefully controlling the purity and molar ratio of the reactants, e.g., the epsilon caprolactone reactant and the difunctional active hydrogen-containing initiator, there are produced poly(oxycaproyl) diols whose number average molecular weight can range from about 500 to several thousand, e.g., 25,000 and greater. The poly(oxycaproyl) diols can also be prepared by reacting an epsilon-caprolactone and/or its oligomers and/or the corresponding hydroxyacid, e.g., a 6-hydroxycaproic acid, with a mixture comprising diol and dicarboxylic acid, using a molar excess of diol with relation to the dicarboxylic acid. The water of esterification which results during the reaction can be removed via conventional techniques. Illustrative of the diols and dicarboxylic acid which can be used include ethylene glycol, propylene glycol, diethylene glycol, dipropylene glycol, 1,4-butanediol, 1,5-pentanediol, 1,6-hexanediol, 1,10-decanediol, 1,4-cyclohexanediol, succinic acid, glutaric acid, adipic acid, pimelic acid, suberic acid, azelaic acid, sebacic acid, phthalic acid, and the like.

The poly(tetramethylene oxide) glycols which are contemplated can be represented by the formula

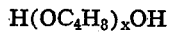

wherein $x$ is a number sufficiently large so that the number average molecular weight is at least about 700 and upwards to about 3500, preferably from about 1000 to about 3000. The preparation of such glycols is extensively described in the literature.

In an especially preferred embodiment unit (I) supra is the oxycaproyl or oxypentamethylenecarbonyl unit, that is,

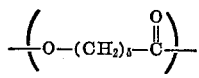

Any of a wide variety of organic diisocyanates may be employed in the practice of the invention, including aromatic, aliphatic, and cycloaliphatic diisocyanates and combinations of these types. Representative compounds include the m- and p-phenylene diisocyanates, the 2,4- and 2,6-tolylene diisocyanates, 4,4-biphenylene diisocyanate, p,p'-bibenzyl diisocyanate, p,p'-diphenylmethane diisocyanate, 4,4'-methylene-bis(orthotolyl isocyanate), 1,5-naphthalene diisocyanate, 1,6-hexamethylene diisocyanate, 4,4'-methylene-bis(cyclohexyl isocyanate), 1,5-tetrahydronaphthalene diisocyanate, bis(2-isocyanatoethyl) fumarate, and the like. The diisocyanates may contain other substituents, although those which are free from reactive groups other than the two isocyanato groups are most desirable. Aromatic diisocyanates, i.e., those in which the isocyanato groups are attached to the same or different aromatic rings, are especially preferred.

The difunctional chain extender which is employed is characterized by two functional groups each of which contains "active hydrogen atoms." These functional groups are preferably in the form of hydroxyl, primary amino, secondary amino, and mixtures thereof. The term "active hydrogen atoms" refers to hydrogens which, because of their position in the molecule, display activity according to the Zerewitinoff test as described by Kohler in J. Am. Chem. Soc., 49, 31–81 (1927). The difunctional chain extenders may be of the aliphatic, cycloaliphatic or aromatic type and they are best illustrated by diols, diamines, or aminoalcohols. Illustrative difunctional chain extenders include ethylene glycol, propylene glycol, 1,4-butanediol, 1,3-butanediol, 1,5-pentanediol, 2,2-dimethyl-1,3-propanediol, 1,7-heptanediol, 1,6-hexanediol, 1,10-decanediol, 1,12-dodecanediol, diethylene glycol, triethylene glycol, dibutylene glycol, 1,4-cyclohexanediol, 1,4-bis(2-hydroxyethoxy)cyclohexane, 1,4-bis(2-hydroxyethoxy)benzene, 2-mercaptoethanol, N-methylethanolamine, N-methylisopropanolamine, 4-aminocyclohexanol, 1,2-diaminoethane, 1,3-diaminopropane, diethylenetriamine, 1,5-naphthalenediamine, toluene-2,4-diamine, toluene-2,6-diamine, para-xylylenediamine, meta-xylylenediamine 4,4 - methylenedianiline, 4,4'-ethylenedianiline, 1,4-cyclohexanediamine, piperazine, 4,4' - methylene-bis(o-chloroaniline), 2,5-dimethylpiperazine, hydrazine, and the like. In general, it is desirable to employ a difunctional chain extender which has an average molecular weight below about 325. If desired, a small amount of a higher polyfunctional chain extender can be employed in the preparation of the novel products such as, for example, 1,1,1-trimethylolpropane, 1,1,1 - trimethylolethane, pentaerthyritol, glycerol, 1,2,6-hexanetriol, and the like.

The novel poly(oxytetramethylene)-polyurethane products may be prepared according to several different procedures. In one typical procedure, the so-called "one shot" process, the mixture comprising polymeric diols, organic diisocyanate, and difunctional chain extender, and other ingredients, if any, are simultaneously mixed and reacted at an elevated temperature. A second typical procedure involves the so-called "prepolymer" method in which the mixture comprising polymeric diols is first reacted with the organic diisocyanate to form a diisocyanato-terminated prepolymer (commonly called "prepolymer") and subsequently reacting this prepolymer with the difunctional chain extender to produce the novel poly(oxytetramethylene)-polyurethane products. The so-called "quasi-prepolymer" technique can also be used. Variations of the aforesaid procedures can be employed such as first reacting the difunctional chain extender with the organic diisocyanate and then reacting the resulting reaction product with the dihydroxyl-terminated polymers.

The preparation of the novel poly(oxytetramethylene)-polyurethane products can take place over a wide temperature range, e.g., from about 20° C. to about 180° C. and higher. In many instances, a preferred reaction temperature range is from about 50° C. to about 160° C. The upper limit of the reaction temperature is realistically controlled by the terminal stability of the reactants and the reaction products whereas the lower limit is regulated, to a practical degree, by the reaction rate. In general, the optimum reaction temperature employed will be significantly influenced by the choice of the reactants, the ratio of NCO to OH equivalents from the reactants, the degree of cure desired, the use of a catalyst, and other factors. Depending on these and other factors, the art classification of the novel products can be thermoplastic millable polyurethanes, thermoplastic polyurethanes (Estane type), thermoplastic processable polyurethanes (Texin type), microcellular elastomeric polyurethanes, etc. The thermoplastic polyurethanes can be in solution, i.e., dissolved in an organic solvent such as tetrahydrofuran or dimethylformamide, in the form of pellets or granules which are partially cured, or in the form of fully cured shaped products having applicability as a finished part.

In the preparation of the novel poly(oxytetramethylene)-polyurethane products, the molar ratio of polymeric diol mixture to organic diisocyanate is from about 1.0:1.1 to about 1:8, and preferably from about 1.0:1.2 to about 1:5. With reference to the molar ratios of polymeric diol mixture to difunctional chain extender, it is generally desirable to employ from about 1.0:0.1 to about 1:7, and preferably from about 1.0:0.5 to about 1:4.

To a significant degree the character of the poly(oxytetramethylene)-polyurethane products will be influenced by the over-all molar ratio of the sum of the mixture comprising polymeric diols plus difunctional chain extender to organic diisocyanate and, in general, such ratio will be between about 0.9 and about 1.1. In lieu of expressing the proportion of the reactants by reference to the molar ratios employed in the polyurethane forming formulation, essentially the same result is obtained by referring to hydroxyl equivalents (or hydroxyl groups) and isocyanato equivalents (or isocyanato groups). In the preferred poly(oxytetramethylene)-polyurethane products of this invention, the proportion of such products which is attributable to the polymeric diol mixture is from about 60 to about 95 weight percent.

Novel thermoplastic millable poly(oxytetramethylene)-polyurethane products can be prepared when the over-all ratio of the reactants is such that the sum of the polymeric diol mixture plus the difunctional chain extender to the organic diisocyanate is between about one and about 1.1. The reaction is desirably effected at an elevated temperature range, e.g., from about 50° C. to about 160° C. The reaction can be a "one shot" process, or a step-wise process (prepolymer process) can be employed. The reaction time can vary from minutes to hours. The resulting poly(oxytetramethylene)-polyurethane millable product (gum) can be thoroughly mixed with additional organic polyisocyanate, e.g., one to ten weight percent based on the millable product, on a rubber mill and then cured in a mold under heat and sufficient pressure. The additional polyisocyanate reacts with any residual active hydrogen atoms (in the form of hydroxyl and/or amino) and is believed to effect branching and crosslinking by reacting with the hydrogen of urethane groups and/or urea groups, if any, to thus form allophanate and/or biuret linkages.

"True" thermoplastic poly(oxytetramethylene)-polyurethane products can be prepared in a manner similar to the preparation of the millable gum except that the amounts of the polyurethane-forming ingredients are such as to provide a ratio of total active hydrogen equivalents (in the form of hydroxyl with/without amino or other active hydrogen-containing groups) to isocyanato equivalents of approximately one. The reaction can be conducted in bulk or in a solvent such as dimethylformamide, generally at an elevated temperature, e.g. about 80° C. to about 160° C., for a period of time ranging from minutes to several hours. After this, the resulting partially cured material can be cooled, diced, stored, and/or postcured at ambient temperatures for a period of several days, or at an elevated temperature for a lesser period of time.

Basically, microcellular polyurethanes are high density (20–60 lbs./cu. ft.) closed celled, high performance, urethane foams with an integral skin of desired thickness. The microcellular polyurethanes have long been recognized as important engineering materials having the desirable properties of non-cellular elastomers but being lower in cost per molded item. Some applications for microcellular polyurethane elastomers include shoe soles, car bumper inserts, industrial tires, industrial rollers, vibrator pads, and numerous other industrial applications.

The microcellular polyurethane elastomeric product is preferably made by processing two reactive liquid streams in a urethane metering-mixing machine. One of the liquid streams desirably contains the organic diisocyanate and halocarbon blowing agent, if used, and the other stream usually contains the polymeric diol mixture, difunctional chain extender, catalyst, surfactant, and water, if used. The ratio of active hydrogen equivalents to isocyanato equivalents is maintained at approximately one, e.g., total hydroxyl equivalents of from about 0.95 to about one or slightly higher per isocyanato equivalent.

A pre-set quantity of the liquid mix is delivered by the machine into a heated, closable mold. When the two streams are reacted, a urethane polymer is formed. The heat generated by the reaction of the two liquid streams volatilizes the blowing agent and causes the reaction mixture to foam. At the same time, the heat accelerates the reaction of the reaction mixture, causing it to first gel and then cure. The mold is closed immediately after pouring to control the density of the polyurethane product and its desired configuration. An integral skin is formed next to the mold surface because of the viscosity rise and solidification at the cooler outer section of the foam mixture being rapid enough to prevent or suppress the action of the blowing agent. Desirably, the hydroxyl-containing stream is maintained at a temperature of from about 30° C. to about 100° C., and the isocyanato-containing stream at a temperature of from about 25° C. to about 85° C. The temperature of the mold is suitably maintained between about 30° C. and about 100° C.

Thermoplastic processable poly(oxytetramethylene)-polyurethane products can be prepared by maintaining the over-all molar ratio of reactants such that the sum of the polymeric diol mixture plus the difunctional chain extender to the organic diisocyanate is between about 0.9 to about one. The "one shot" or prepolymer techniques may be used. Preferably, the reactants are heated separately, e.g., about 75° C. to 165° C., and then the polymeric diol mixture and difunctional chain extender are simultaneously added to the organic diisocyanate under agitation. Alternatively, the heated polymeric diol mixture and difunctional chain extender are first mixed, and then this mixture is added to the heated diisocyanate under rapid mixing conditions. The reaction mixture after complete mixing is conducted onto a suitable heated surface and preferably maintained thereat at a temperature of from about 75° C. to about 165° C. until the viscous mixture begins to solidify generally within a few minutes, e.g., about 2 to 10 minutes and perhaps longer. At this stage, the solidified reaction mass is a partially cured material which can be easily removed and reduced, generally at ambient temperatures, into the desired particle size such as by dicing or pelletizing. The resulting material oftentimes referred to as "green stock" is thermoplastically processable and is suitable for fabricating into finished parts via techniques such as extrusion, injection molding, compression molding, and similar procedures familiar to the industry. Under the heat and pressure conditions which are employed in such techniques it is believed that the thermoplastically processable mass undergoes further reaction such as crosslinking of residual isocyanato with urethane hydrogen to form allophanate bonds, etc. The "green stock," in a pelleted or diced form, is best maintained under anhydrous conditions in view of the small amount of free isocyanato groups still present therein.

Various compounds can be employed to catalyze or accelerate the isocyanato/active hydrogen reaction. Compounds which are oftentimes useful include the tertiary amines, phosphines, and various organic metallic compounds in which the metal can be bonded to carbon and/or other atoms such as oxygen, sulfur, nitrogen, halo, hydrogen and phosphorus. The metal moiety of the organic metallic compounds can be, among other, tin, titanium, lead, potassium, sodium, arsenic, antimony, bismuth, manganese, iron, cobalt, nickel, and zinc. Of those which deserve special mention are the organic metallic compounds which contain at least one oxygen to metal bond and/or at least one carbon to metal bond, especially wherein the metal moiety is tin, lead, bismuth, arsenic, or antimony. The tertiary amines, the organic tin compounds (which includes the organotin compounds), and the organic lead compounds are eminently preferred. Preferred subclasses of organic metallic compounds include the acylates, particularly the alkanoates, the alkoxides of Sn (I°), Sn (IV), Pb (II), Ti (IV), Zn (IV), Co (II), Mn (II), Fe (III), Ni (II), K, and Na. An additional subclass which is extremely useful is the dialkyltin dialkanoates.

Specific catalysts include, by way of illustrations, 1,4-diazabicyclo[2.2.2]octane, N,N,N',N'-tetramethyl-1,3-butanediamine, bis[2-(N,N-dimethylamino)ethyl] ether, bis [2-(N,N-dimethylamino)-1-methylethyl] ether, N-methylmorpholine, sodium acetate, potassium laurate, stannous octanoate, stannous oleoate, lead octanoate, tetrabutyl titanate, ferric acetylacetonate, cobalt naphthenate, tetra-tetramethyltin, tributyltin chloride, tributyltin hydride, trimethyltin hydroxide, dibutyltin oxide, dibutylin dioctanote, ditbuyltin dilaurate, butylin trichloride, triethylstibine oxide, potassium hydroxide, sodium carbonate, magnesium oxide, stannous chloride, stannic chloride, bismuth nitrate. In preparing porous products such as microcellular elastomeric products, it is extremely advantageous to employ a combination of the tertiary amine compound and the organic tin compound as catalysts in the formulation. The catalyst is used in catalytically significant quantities. For instance, concentrations in the range of from about 0.001 weight percent, and lower, to about 2 weight percent, and higher, based on the total polyurethane-forming ingredients, have been found to be satisfactory.

In preparing microcellular elastomeric products, especially foamed products which have a density of from about 15 to about 60, preferably from about 20 to about 55, pounds per cubic foot, various blowing agents such as water and halogenated hydrocarbons can be employed. The preferred blowing agents are water and certain halogen-substituted aliphatic hydrocarbons which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1 - dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chloro - 1,1,1,2,3,3,4,4,4 - nonafluorobutane, hexafluorocyclobutene, and octafluorocyclobutane. Other useful blowing agents include low-boiling hydrocarbons such as butane, pentane, hexane, cyclohexane, and the like.

In producing microcellular elastomeric products it is generally desirable to employ small amounts, e.g., about 0.001% to 2.0% by weight, based on the total reaction mixture, of an emulsifying agent such as a polysiloxane-polyoxyalkylene block copolymer having from about 10 to 80 percent by weight of siloxane polymers and from 90 to 20 percent by weight of alkylene oxide polymer, such as the block copolymers described in U.S. Pats. 2,834,748 and 2,917,480. Another useful class of emulsifiers are the "non-hydrolyzable" polysiloxane-polyoxyalkylene block copolymers such as those described in U.S 2,846,458. This class of compounds differs from the above-mentioned polysiloxane-polyoloxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent of polysiloxane polymer with the remainder being polyoxyalkylene polymer. The copolymers can be prepared, for example, by heating a mixture of (a) a polysiloxane polymer containing a silicon-bonded, halogen, substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers and surfactants include such materials as dimethyl silicone oil, polyethoxylated vegetable oils, and the like.

Various modifying agents can be added to the polyurethane-forming formulations among which can be listed fillers such as carbon blacks, various clays, zinc oxide, titanium dioxide, and the like; various dyes; plasticizers such as polyesters which do not contain any reactive endgroups, organic esters of stearic and other fatty acid, metal salts of fatty acids, dioctyl phthalate, tetrabutylthiodisuccinate; glass; asbestos; and the like.

One aspect of the invention is directed to the preparation of novel isocyanato-terminated prepolymers (hereinafter referred to as "prepolymer(s)") which result from the reaction of the mixture comprising polymeric diols with a molar excess of the organic diisocyanate. Equation II below illustrates the linear extension reaction involved.

(II)    HOXOH + excess Y(NCO)₂ ⟶

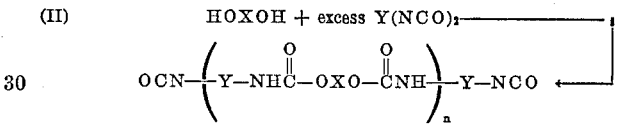

(i) wherein HOXOH is an abbreviated representation of the polymeric diol mixture which comprises (a) from about 3 to about 30 weight percent, preferably from about 5 to about 25 weight percent, of poly(oxycaproyl) diol which has a number average molecular weight of from about 3500 to about 40,000, preferably from about 5000 to about 25,000, and which is characterized by the recurring structural linear unit of the formula:

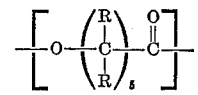

wherein each R individually can be hydrogen or lower alkyl, preferably hydrogen, with the proviso that no more than three R substituents are groups other than hydrogen, and (b) from about 97 to about 70 weight percent, preferably from about 95 to about 75 weight percent, of poly(tetramethylene oxide) glycol which has a number average molecular weight of from about 700 to about 3500, preferably from about 1000 to about 3000; said poly(oxycaproyl) diol and said poly(tetramethylene oxide) glycol differing in number average molecular weight by at least about 1000, preferably by at least about 2500;
(ii) wherein Y(NCO)₂ represents an organic diisocyanate;
(iii) wherein $n$ is an integer greater than zero;
(iv) wherein OXO is a bivalent radical resulting from the removal of the hydroxylic hydrogen atoms from said polymeric diol mixture; and
(v) wherein Y is a bivalent organic radical without the two isocyanato groups from said organic diisocyanate.

It will be noted from Equation II supra that the use of an excess of diisocyanate provides an efficient means of control over the degree of linear extension of the polyurethane molecule. If the proportions of polymeric diol mixture and diisocyanate are chosen so that the number of reactive terminal hydroxyl groups from the former is equal to the number of reactive isocyanato groups from the latter, relatively long, high molecular weight chains would be formed.

During and after the preparation of the prepolymers it is oftentimes desirable to stabilize such prepolymers by the addition of retarders to slow down subsequent further polymerization or less desirable side-reactions such as, for example, allophanate formation. Retarders may be added to the organic diisocyanate, polymeric diol mixture, and/or prepolymer. Illustrative of the retarders suitable for the diol-diisocyanate reaction are hydrochloric acid, sulfuric acid, phosphoric acid, boric acid, acetyl chloride, para-toluenesulfonyl chloride, phosphorous trichloride, phosphorus oxychloride, sulfuryl chloride, thionyl chloride, and sulfur dioxide.

The prepolymer shown in Formula II supra can then be reacted through their free isocyanato groups with the difunctional chain extender. In such reactions, the "active hydrogen" from the difunctional chain extender is added to the isocyanato nitrogen of the organic diisocyanate. The remainder of the difunctional chain extender becomes bonded to the carbonyl carbon unless decarboxylation or further reaction occurs. The following equations illustrate the chain extension reaction involved:

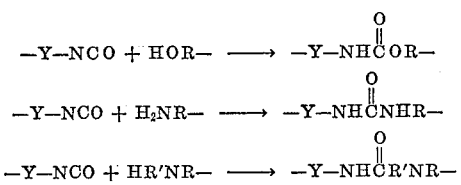

The reaction of the isocyanato groups with water (HOH) can be considered to proceed through an intermediate

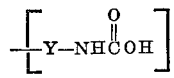

which then undergoes decarboxylation to the amine followed by the amino/isocyanato reaction to give urea linkages in the polymer. The over-all reactions can be illustrated as follows:

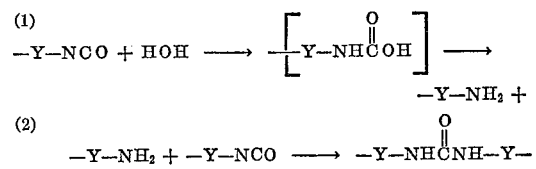

After reaction of the difunctional chain extender with the prepolymer and any excess diisocyanate which may be present, the resulting novel polymeric product is a poly(oxytetramethylene)-polyurethane being comprised essentially of structural units having the Formula III:

(III)

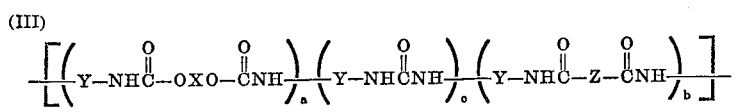

(i) wherein OXO represents bivalent radicals which result from the removal of the hydroxylic hydrogen atoms (the hydrogen from the hydroxyl (—OH) groups) from a polymeric diol mixture which comprises (a) from about 3 to about 30 weight percent, preferably from about 5 to about 25 weight percent, of poly(oxycaproyl) diol which has a number average molecular weight of from about 3500 to about 40,000, preferably from about 5000 to about 25,000, and which is characterized by the recurring structural linear unit of the formula:

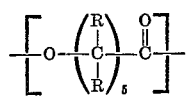

wherein each R individually can be hydrogen or lower alkyl, preferably hydrogen, with the proviso that no more than three R substituents are groups other than hydrogen, and (b) from about 97 to about 70 weight percent, preferably from about 95 to about 75 weight percent, of poly(tetramethylene oxide) glycol which has a number average molecular weight of from about 700 to about 3500, preferably from about 1000 to about 3000; said poly(oxycaproyl) diol and said poly(tetramethylene oxide) glycol differing in number average molecular weight by at least about 1000, preferably by at least 2500;

(ii) wherein Z is a bivalent radical which results from the removal of an active hydrogen atom from both functional groups of a difunctional chain extender, said functional groups preferably being hydroxyl, amino, or mixtures thereof;

(iii) wherein Y is a bivalent organic radical which results from the removal of both isocyanato groups of an organic diisocyanate;

(iv) wherein $a$ is an integer greater than zero;

(v) wherein $b$ is an integer greater than zero;

(vi) wherein $c$ is an integer including zero;

(vii) wherein the over-all ratio of the number of OXO to Y radicals in said product is in the range of from about 1.0:1.1 to about 1:8, preferably from about 1.0:1.2 to about 1:5; and (viii) wherein the over-all ratio of the number of OXO to Z radicals in said product is in the range of from about 1.0:0.1 to about 1:7, preferably from about 1.0:0.5 to about 1:4.

When the polyurethane-producing formulation contains water in addition to the polymeric diol mixture, organic diisocyanate, and difunctional chain extender, the variable $c$ in Formula III supra is an integer which has a value greater than zero. The resulting products thus produced by the practice of the invention will be elastomeric microcellular poly(oxytetramethylene) - polyurethane products.

When water is omitted from the polyurethane producing formulation, the variable $c$ in Formula III supra has a value of zero. The resulting products thus produced by the practice of the invention will be solid poly(oxytetramethylene)-polyurethane products which can vary, depending primarily on the ratio of total hydroxyl to isocyanato equivalents use in the formulation, from thermoplastic millable to thermoplastic (Estane type) to thermoplastic processable (Texin type) materials. When a blowing agent such as a halocarbon is employed there can also be obtained microcellular elastomeric products.

Various terms, abbreviations, designations, methods, etc., used in this specification are explained hereinbelow.

Unless otherwise stated, the term "parts" designates parts by weight.

The abbreviation "ASTM" stands for American Society for Testing Materials.

The various properties of the poly(oxytetramethylene)-polyurethane products were determined by the following ASTM methods:

Hardness, Shore A _____ ASTM D2240–64T.
100% modulus, p.s.i. _____ ASTM D412–64T.
300% modulus, p.s.i. _____ ASTM D412–64T.
Tensile strength, p.s.i. _____ ASTM D412–64T.
Ultimate elongation, percent _____ ASTM D412–64T.
Graves tear, p.l.i. _____ ASTM D624–54.
Split tear, p.l.i. _____ ASTM D–1938.
B compression set, percent _____ ASTM D395–61.
Zwick resilience, percent _____ ASTM DiN 53–512.

Polyol 2025 represents polypropylene glycol which has a number average molecular weight of about 2025.

Polyol 30 represents poly(oxycaproyl) diol which has a number average molecular weight of about 10,000 and which is prepared by reacting epsilon-caprolactone with diethylene glycol initiator at a molar ratio of about 85:1 in the presence of stannous dioctanoate as the catalyst therefor.

Polyol PTOG represents poly(tetramethylene oxide) glycol which has a number average molecular weight of about 2000.

MDI represents p,p'-diphenylmethane diisocyanate.

In the operative examples, the general procedure for preparing polyurethane products was as follows. To a 500 milliliter reaction flask equipped with heating mantle, stirrer, thermometer, and vacuum inlet tube, there were added the polymeric diols, followed by heating to a temperature of from about 120° C. to about 140° C. for a period of 15 to 30 minutes at 5 mm. of Hg to remove moisture and dissolved gases therefrom. After this, the pressure was increased to atmospheric and the abovesaid polymeric diols were then added to a heated mold maintained at 140° C. The difunctional chain extender was added thereto and the resulting admixture was maintained at 140° C. The diisocyanate compound was added to said admixture under vigorous stirring for about one minute and this agitated reaction mixture was placed in an air-oven at 140° C. for 3 hours. The ratio of equivalents of hydroxyl:isocyanato:hydroxyl from the polymeric diols:diisocyanate compound:difunctional chain extender, respectively, was 1:3:2. After removal from said air-oven, the resulting polyurethane product was removed from the mold and postcured for one week at ambient temperature, i.e., about 22° C. Test plaques (0.075 inch thick) and compression set buttons (ASTM D395–61) were compression molded from said product and tested.

The invention is illustrated by the following operative examples. In these examples, the quantity of the reactants employed is expressed in parts.

EXAMPLES 1–2

Using the procedure detailed in the section prior to the examples, polyurethane products were prepared in two separate experiments. The relatively low molecular weight polymeric diol (Polyol PTOG) possessed a number average molecular weight of about 2000. The relatively high molecular weight polymeric diol (Polyol 30) possessed a number average molecular weight of about 10,000. Various physical properties of the polyurethane products were then ascertained in accordance with established test methods. The data are set out in Table I below.

TABLE I

| Examples | 1 | 2 |
|---|---|---|
| Polyol PTOG | 196 | 180 |
| Polyol 30 | | 20 |
| 1,4-butanediol | 18 | 16.8 |
| MDI | 75 | 70 |
| Hardness, Shore A | 85 | 85 |
| 100% modulus, p.s.i | 890 | 745 |
| 300% modulus, p.s.i | 1,405 | 1,305 |
| Tensile strength, p.s.i | 1,780 | 6,650 |
| Ultimate elongation, percent | 400 | 570 |
| Graves tear, p.l.i | 440 | 430 |
| Split tear, p.l.i | 120 | 115 |
| B compression set, percent | 65 | 50 |
| Zwick resilience, percent | 40 | 65 |

EXAMPLES 3–4

Using the procedure detailed in the section prior to the examples, polyurethane products were prepared in two separate experiments. The relatively low molecular weight polypropylene glycol (Polyol 2025) possessed a number average molecular weight of about 2025. Various physical properties of these products were then ascertained in accordance with established test methods. The data are set out in Table II below.

TABLE II

| Examples | 3 | 4 |
|---|---|---|
| Polyol 2025 | 198 | 180 |
| Polyol 30 | | 20 |
| 1,4-butanediol | 18 | 16.8 |
| MDI | 75 | 69.8 |
| Hardness, Shore A | 77 | 74 |
| 100% modulus, p.s.i | 585 | 510 |
| 300% modulus, p.s.i | 900 | 775 |
| Tensile strength, p.s.i | 1,540 | 1,745 |
| Ultimate elongation, percent | 725 | 930 |
| Graves tear, p.l.i | 310 | 300 |
| Split tear, p.l.i | 135 | 120 |
| B compression set, percent | 66 | 66 |
| Zwick resilience, percent | 50 | 50 |

What is claimed is:

1. A poly(oxytetramethylene)-polyurethane polymeric product consisting essentially of structural units of the formula:

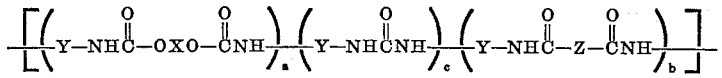

(i) wherein OXO represents bivalent radicals which result from the removal of the hydroxylic hydrogen atoms from a polymeric diol mixture which comprises a blend of (a) from about 3 to about 30 weight percent of poly(oxycaproyl) diol which has a number average molecular weight of from about 3500 to about 40,000 and which is characterized by the recurring structural linear unit of the formula:

$$\left[ -O - \left( \underset{R}{\overset{R}{C}} \right)_5 - \overset{O}{\underset{}{C}} - \right]$$

wherein R is of the group consisting of hydrogen and lower alkyl, with the proviso that no more than three R substituents are groups other than hydrogen, and (b) from about 97 to about 70 weight percent of poly(tetramethylene oxide) glycol which has a number average molecular weight of from about 700 to about 3500; said poly(oxycaproyl) diol and said poly(tetramethylene oxide) glycol differing in number average molecular weight by at least about 1000 and each being prepared in distinctly separate polymerization steps;

(ii) wherein Z is a bivalent radical which results from the removal of an active hydrogen atom from both functional groups of a difunctional chain extender, said functional groups being of the group consisting of hydroxyl, amino, and mixtures thereof;

(iii) wherein Y is a bivalent organic radical which results from the removal of both isocyanato groups of an organic diisocyanate;

(iv) wherein $a$ is an integer greater than zero;

(v) wherein $b$ is an integer greater than zero;

(vi) wherein $c$ is an integer including zero;

(vii) wherein the over-all ratio of the number of OXO to Y radicals in said product is between about 1.0:1.1 to about 1:8; and (viii) wherein the over-all ratio of the number of OXO to Z radicals in said product is between about 1.0:0.1 to about 1:7.

2. The poly(oxytetramethylene)-polyurethane polymeric product of claim 1 wherein said recurring unit has the formula

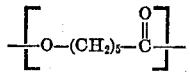

3. The poly(oxytetramethylene)-polyurethane polymeric product of claim 1 wherein said polymeric diol mixture comprises (a) from about 5 to about 25 weight percent of poly(oxycaproyl) diol which has a number average molecular weight of from about 5000 to about 25,000 and which is characterized by the recurring structural linear unit of the formula:

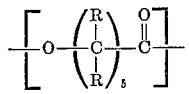

wherein R is of the group consisting of hydrogen and lower alkyl, with the proviso that no more than three R substituents are groups other than hydrogen, and (b) from about 95 to about 75 weight percent of poly(tetramethylene oxide) glycol which has a number average molecular weight of from about 1000 to about 3000.

4. The poly(oxytetramethylene)-polyurethane polymeric product of claim 1 wherein said polymeric diol mixture comprises (a) from about 3 to about 30 weight percent of poly(oxycaproyl) diol which has a number average molecular weight of from about 3500 to about 40,000, and (b) from about 97 to about 70 weight percent of poly(tetramethylene oxide) glycol which has a number average molecular weight of from about 700 to about 3500; said poly(oxycaproyl) diol and said poly(tetramethylene oxide) glycol differing in number average molecular weight by at least about 1000; and said poly(oxycaproyl) diol being characterized by the recurring linear unit of the formula

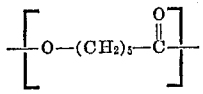

5. An elastomeric poly(oxytetramethylene) - polyurethane polymeric product of claim 2 wherein the over-all ratio of the sum of (OXO+Z) to Y is between about 0.9 and about 1.1, and wherein $c$ has a value of zero.

6. A microcellular elastomeric poly(oxytetramethylene)-polyurethane polymeric product of claim 2 wherein the over-all ratio of the sum of (OXO+Z) to Y is approximately one, and wherein $c$ has a value greater than zero.

7. A thermoplastic poly(oxytetramethylene)-polyurethane polymeric product of claim 2 wherein the over-all ratio of the sum of (OXO+Z) to Y is between about one and about 1.1, and wherein $c$ has a value of zero.

8. A thermoplastically processable poly(oxytetramethylene)-polyurethane polymeric product of claim 2 wherein the over-all ratio of the sum of (OXO+Z) to Y is between about 0.9 and about one, wherein Z is a bivalent radical resulting from the removal of the hydroxylic hydrogen atoms of a diol chain extender, and wherein $c$ has a value of zero.

9. Linear poly(oxytetramethylene)-polyurethane prepolymers of the formula:

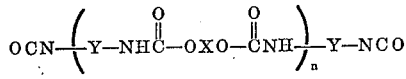

(i) wherein OXO represents bivalent radicals which result from the removal of the hydroxylic hydrogen atoms from a polymeric diol mixture consisting essentially of a blend of (a) from about 3 to about 30 weight percent of poly(oxycaproyl) diol which has a number average molecular weight of from about 3500 to about 40,000 and which is characterized by the recurring structural linear unit of the formula:

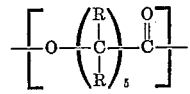

wherein R is of the group consisting of hydrogen and lower alkyl, with the proviso that no more than three R substituents are groups other than hydrogen, and (b) from about 97 to about 70 weight percent of poly(tetramethylene oxide) glycol which has a number average molecular weight of from about 700 to about 3500; said poly(oxycaproyl) diol and said poly(tetramethylene oxide) glycol differing in number average molecular weight by at least about 1000 and each being prepared in distinctly separate polymerization steps;

(ii) wherein $n$ is an integer greater than zero; and (iii) wherein Y is a bivalent organic radical which results from the removal of both isocyanato groups of an organic diisocyanate.

References Cited

UNITED STATES PATENTS

| | | | |
|---|---|---|---|
| 3,663,515 | 5/1972 | Hostettler et al. | 260—77.5 |
| 3,591,561 | 7/1971 | Kazama et al. | 260—77.5 |
| 2,933,478 | 4/1960 | Young et al. | 260—77.5 |
| 2,962,455 | 11/1960 | Hostettler et al. | 260—77.5 |
| 3,509,102 | 4/1970 | Horn et al. | 260—77.5 |
| 3,523,101 | 8/1970 | Reuter | 260—47 |
| 3,660,357 | 5/1972 | Kolycheck | 260—77.5 |
| 2,990,379 | 6/1961 | Young et al. | 260—2.5 |

M. J. WELSH, Primary Examiner

H. S. COCKERAM, Assistant Examiner

U.S. Cl. X.R.

260—18 TN, 77.5 AN, 858